(12) United States Patent
Ota

(10) Patent No.: US 8,448,759 B2
(45) Date of Patent: May 28, 2013

(54) SINGLE CYLINDER TYPE HYDRAULIC SHOCK ABSORBER FOR VEHICLE

(75) Inventor: Akihisa Ota, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 665 days.

(21) Appl. No.: 12/084,653

(22) PCT Filed: Nov. 7, 2006

(86) PCT No.: PCT/JP2006/322513
§ 371 (c)(1),
(2), (4) Date: May 7, 2008

(87) PCT Pub. No.: WO2007/055342
PCT Pub. Date: May 18, 2007

(65) Prior Publication Data
US 2009/0107783 A1    Apr. 30, 2009

(30) Foreign Application Priority Data
Nov. 8, 2005    (JP) .................................. 2005-323068

(51) Int. Cl.
*F16F 9/50* (2006.01)
*B60G 13/00* (2006.01)

(52) U.S. Cl.
USPC ............................. 188/281; 188/314; 267/226

(58) Field of Classification Search
USPC .......... 188/313, 281, 276, 314, 280; 267/181, 267/182, 153, 166–180, 226; 92/60
See application file for complete search history.

(56) References Cited

U.S. PATENT DOCUMENTS

| 3,512,243 | A | * | 5/1970 | Suzuki et al. | .................... | 29/434 |
| 3,806,105 | A |   | 4/1974 | Konishi et al. | | |
| 4,007,667 | A | * | 2/1977 | Elias et al. | ......................... | 92/60 |
| 4,457,497 | A | * | 7/1984 | Ojima | ............................ | 267/134 |
| 4,634,543 | A | * | 1/1987 | Okada et al. | .................. | 252/78.5 |
| 5,862,893 | A | * | 1/1999 | Volpel | ............................ | 188/276 |
| 5,868,383 | A | * | 2/1999 | Codos | ............................ | 267/80 |
| 6,471,197 | B1 | * | 10/2002 | Denk et al. | .................... | 267/175 |

(Continued)

FOREIGN PATENT DOCUMENTS

| DE | 896310 | C | 11/1953 |
| DE | 1163693 | B | 2/1964 |

(Continued)

OTHER PUBLICATIONS

Roloff/Matek Maschinenelemente, 9th edition, ISBN 3-528-34028-2.

(Continued)

*Primary Examiner* — Bradley King
*Assistant Examiner* — Vishal Sahni
(74) *Attorney, Agent, or Firm* — Rabin & Berdo, P.C.

(57) ABSTRACT

A single cylinder type hydraulic shock absorber for a vehicle (100) includes a cylinder (1), a free piston (2) that is inserted slidably into the cylinder (1) and delimits a fluid chamber (7) and a gas chamber (8) in the cylinder (1), a piston (3) that is inserted slidably into the cylinder (1) and delimits the fluid chamber (7) into two pressure chambers (7a, 7b), a rod (4), one end of which is connected to the piston (3), and an elastic member (9) that is accommodated in the gas chamber (8) and biases the free piston (2) in the direction of the fluid chamber (7). The elastic member (9) is set such that a spring constant thereof increases during contraction.

7 Claims, 5 Drawing Sheets

U.S. PATENT DOCUMENTS

| | | | |
|---|---|---|---|
| 2003/0178758 A1* | 9/2003 | Metelski | 267/166 |
| 2005/0023093 A1* | 2/2005 | Leiphart et al. | 188/283 |
| 2005/0093265 A1* | 5/2005 | Niaura et al. | 280/124.16 |
| 2006/0032716 A1* | 2/2006 | Sintorn | 188/284 |
| 2007/0085251 A1* | 4/2007 | Kikuchi et al. | 267/152 |

FOREIGN PATENT DOCUMENTS

| | | | |
|---|---|---|---|
| DE | 2207720 A1 | | 9/1972 |
| DE | 2218475 A1 | | 10/1973 |
| DE | 19800373 A1 | | 7/1998 |
| FR | 1112300 A | | 3/1956 |
| FR | 1529926 | * | 5/1967 |
| FR | 1529926 A | | 6/1968 |
| JP | 5-8078 | | 2/1993 |
| JP | 63-34336 | | 12/1994 |
| JP | 08-159199 | | 6/1996 |
| WO | WO2005/028910 | * | 3/2005 |

OTHER PUBLICATIONS

Decision rejecting the opposition; issued in corresponding foreign application EP 06832526.5-2424 / 1 947 362; Opposition Division, European Patent Office; Aug. 7, 2012.

* cited by examiner

SINGLE CYLINDER TYPE HYDRAULIC SHOCK ABSORBER FOR VEHICLE

TECHNICAL FIELD

This invention relates to an improvement in a single cylinder type hydraulic shock absorber for a vehicle.

BACKGROUND ART

In a known conventional single cylinder type hydraulic shock absorber that is interposed between a vehicle body and an axle of a vehicle in order to suppress vibration in the vehicle body, a piston that contacts an inner peripheral surface of a cylinder slidingly is attached fixedly to a tip end portion of a rod, and an oil chamber and a gas chamber are delineated by fitting a free piston slidingly within the cylinder (see JP08-159199).

A passage that connects two oil chambers delineated by the piston is provided in the piston, and an orifice or the like that applies resistance to a flow of working oil passing through the passage is interposed in the piston. When the piston slides within the cylinder, the working oil travels between the oil chambers through the passage. Thus, the hydraulic shock absorber generates a damping force.

In this type of hydraulic shock absorber, the gas chamber compensates for variation in the volume of the cylinder occurring when the rod infiltrates the cylinder or withdraws from the cylinder. A pressurized gas is sealed in the gas chamber, and the gas chamber maintains the working oil in the cylinder in a constantly pressurized state.

DISCLOSURE OF THE INVENTION

When the piston speed is high during a contraction stroke in a conventional hydraulic shock absorber, a pressure increase in the gas chamber may not be able to keep up with a pressure increase in a contraction side oil chamber partitioned by the free piston, and as a result, the internal pressure of the contraction side oil chamber may become equal to or greater than the internal pressure of the gas chamber. In such a case, the free piston moves in parallel with the piston such that the volume of the contraction side oil chamber does not vary, and therefore the working oil in the contraction side oil chamber cannot flow easily into an expansion side oil chamber. As a result, the volume of the expansion side oil chamber simply expands.

Under these conditions, the damping characteristic of the hydraulic shock absorber is as shown by the solid line in FIG. 5, where the damping force on the contraction side no longer increases at or above a certain piston speed. Therefore, the damping characteristic shown by the broken line in FIG. 5, which is required to suppress vibration in the vehicle body, cannot be realized.

Further, when the working oil does not flow into the expansion side oil chamber and the volume thereof simply expands, the internal pressure of the expansion side oil chamber may fall below the outside air pressure, causing outside air to be sucked into the cylinder through a gap between the rod and a sealing member provided between the rod and the cylinder. In such a case, aeration, adiabatic compression and so on may occur.

To eliminate these problems, the internal pressure of the gas chamber may be set high in advance. In so doing, however, the internal pressure of the oil chambers in the cylinder becomes higher than necessary, thereby impairing the passenger comfort of the vehicle. Moreover, the internal pressure of the oil chambers acts excessively on the sealing member, and as a result, the rod is prevented from moving smoothly, leading to a reduction in the life of the sealing member.

This invention has been designed in consideration of the problems described above, and it is an object thereof to provide a single cylinder type hydraulic shock absorber which is capable of improving the passenger comfort of a vehicle by exhibiting a favorable damping characteristic even when a piston speed is high.

In order to achieve above object, this invention provides a single cylinder type hydraulic shock absorber for a vehicle, which is interposed between a vehicle body and an axle of a vehicle to suppress vibration in the vehicle body. The single cylinder type hydraulic shock absorber for a vehicle comprises a cylinder, a free piston that is inserted slidably into the cylinder and delimits a fluid chamber and a gas chamber in the cylinder, a piston that is inserted slidably into the cylinder and delimits the fluid chamber into two pressure chambers, a rod, one end of which is connected to the piston, and an elastic member that is accommodated in the gas chamber and biases the free piston in the direction of the fluid chamber, wherein the elastic member is set such that a spring constant thereof increases during contraction.

According to this invention, during a contraction stroke of the shock absorber, the free piston is biased not only by an increase in the internal pressure of the gas chamber, but also by the elastic member, and therefore the interior of the fluid chamber is greatly pressurized. Hence, a situation in which the free piston moves in parallel with the piston is avoided even when the piston speed is high. Accordingly, the damping force on the contraction side is prevented from peaking, and as a result, vibration in the vehicle body can be suppressed sufficiently, enabling an improvement in the passenger comfort of the vehicle.

Furthermore, by avoiding a situation in which the free piston moves in parallel with the piston, the internal pressure of the expansion side pressure chamber is prevented from falling below the outside air pressure. As a result, outside air is prevented from being sucked into the cylinder through a gap between the sealing member and the rod, thereby eliminating the danger of aeration, adiabatic compression, and so on.

Further, the spring constant of the elastic member increases during contraction, and thus the elastic member acts to supplement the biasing force that is applied to the free piston by the internal pressure of the gas chamber. Therefore, the internal pressure of the gas chamber does not need to be set high in advance, and as a result, the passenger comfort of the vehicle is not impaired.

BEST MODES FOR CARRYING OUT THE INVENTION

Embodiments of this invention will be described below with reference to the drawings.

First Embodiment

First, referring to FIGS. 1 to 3, a single cylinder type hydraulic shock absorber for a vehicle 100 according to a first embodiment of this invention will be described.

Figure 1:
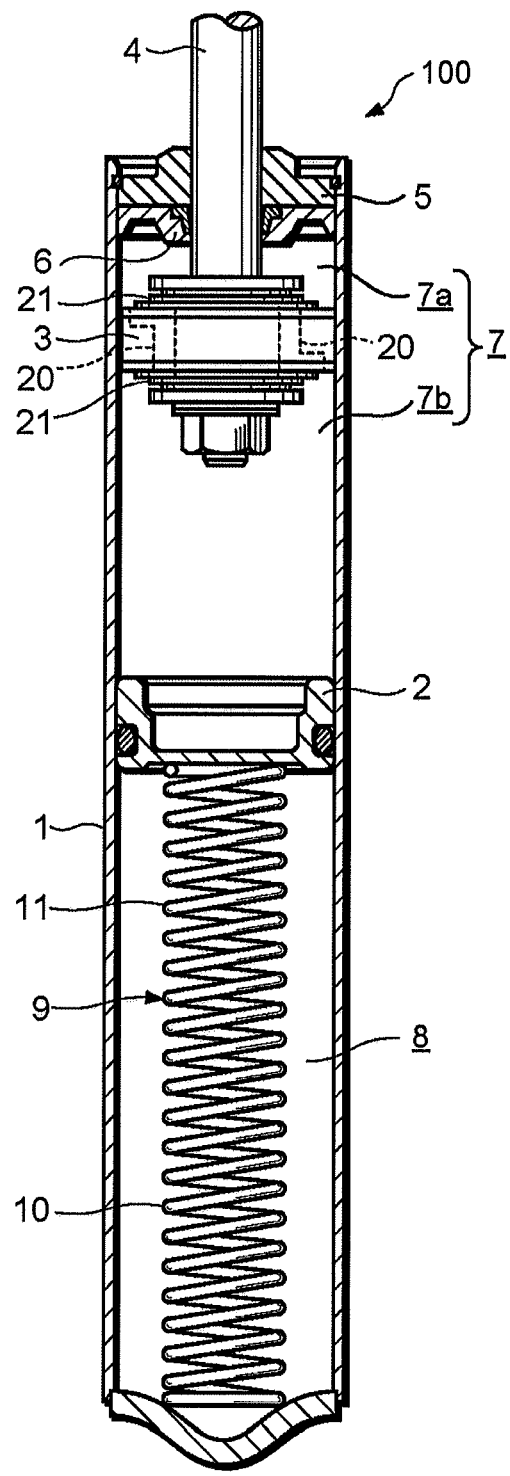
FIG. 1 is a longitudinal sectional view of a single cylinder type hydraulic shock absorber for a vehicle according to an embodiment of this invention.

The single cylinder type hydraulic shock absorber for a vehicle (to be referred to as a "shock absorber" hereafter) 100 is interposed between a vehicle body and an axle of a vehicle to suppress vibration in the vehicle body, and as shown in FIG. 1, comprises a cylinder 1, a free piston 2 that is inserted slidably into the cylinder 1 and delimits a fluid chamber 7 and a gas chamber 8 in the cylinder 1, a piston 3 that is inserted slidably into the cylinder 1 and delimits the fluid chamber 7 into two pressure chambers 7*a*, 7*b*, and a rod 4, one end of which is connected to the piston 3 and another end of which extends to the exterior of the cylinder 1.

A fluid such as working oil is charged into the expansion side pressure chamber 7*a* and the contraction side pressure chamber 7*b*. Further, a pressurized gas is sealed in the gas chamber 8, and a coil spring 9 serving as an elastic member that biases the free piston 2 in the direction of the fluid chamber 7 is accommodated in the gas chamber 8.

The shock absorber 100 is interposed between the vehicle body and the axle via an attachment bracket (not shown) provided on an upper end of the rod 4 and a lower end of the cylinder 1.

A passage 20 connecting the pressure chambers 7*a* and 7*b* is provided in the piston 3, and a damping force generating element 21 that applies resistance to the flow of fluid through this passage 20 is interposed in the passage 20. When the piston 3 slides within the cylinder 1, the fluid travels between the pressure chambers 7*a*, 7*b* through the passage 20, and at this time, the damping force generating element 21 applies resistance to the flow of fluid. Hence, the shock absorber 100 generates a damping force through an expansion/contraction operation, and the damping force is determined in accordance with pressure loss generated by the damping force generating element 21.

There are no limitations on the damping force generating element 21 as long as it is capable of applying resistance to the flow of fluid passing through the passage 20 so as to generate a predetermined pressure loss, and a damping valve such as an orifice or a leaf valve may be employed, for example.

The rod 4 penetrates a sealing member 6 of an annular head member 5 that is provided in an open end of the cylinder 1 and seals the interior of the cylinder 1. The rod 4 extends coaxially with the cylinder 1 to the exterior of the cylinder 1.

The gas chamber 8 is delineated on a bottom portion side of the cylinder 1, or in other words the opposite end side of the rod 4. The gas chamber 8 compensates for variation in the volume of the cylinder 1 occurring when the rod 4 infiltrates the cylinder 1 or withdraws from the cylinder 1. More specifically, when the shock absorber 100 expands and contracts, the free piston 2 moves such that the volume of the gas chamber 8 increases and decreases.

The coil spring 9 comprises a small spring constant site 10 and a large spring constant site 11, and the length thereof is set such that the coil spring 9 remains in contact with the end face of the free piston 2 even when the shock absorber 100 is in a maximally expanded state and the volume of the gas chamber 8 is at a maximum.

By setting the length of the coil spring 9 in this manner, the free piston 2 and coil spring 9 are maintained in a state of constant contact, regardless of the expansion/contraction amount of the shock absorber 100. In other words, the coil spring 9 is always sandwiched between the free piston 2 and the end portion of the cylinder 1. Hence, a situation in which the free piston 2 and the coil spring 9 collide vigorously and the coil spring 9 moves violently within the cylinder 1 when the shock absorber 100 expands and contracts, is avoided. Therefore, abnormal noise generation is prevented.

Figure 2:
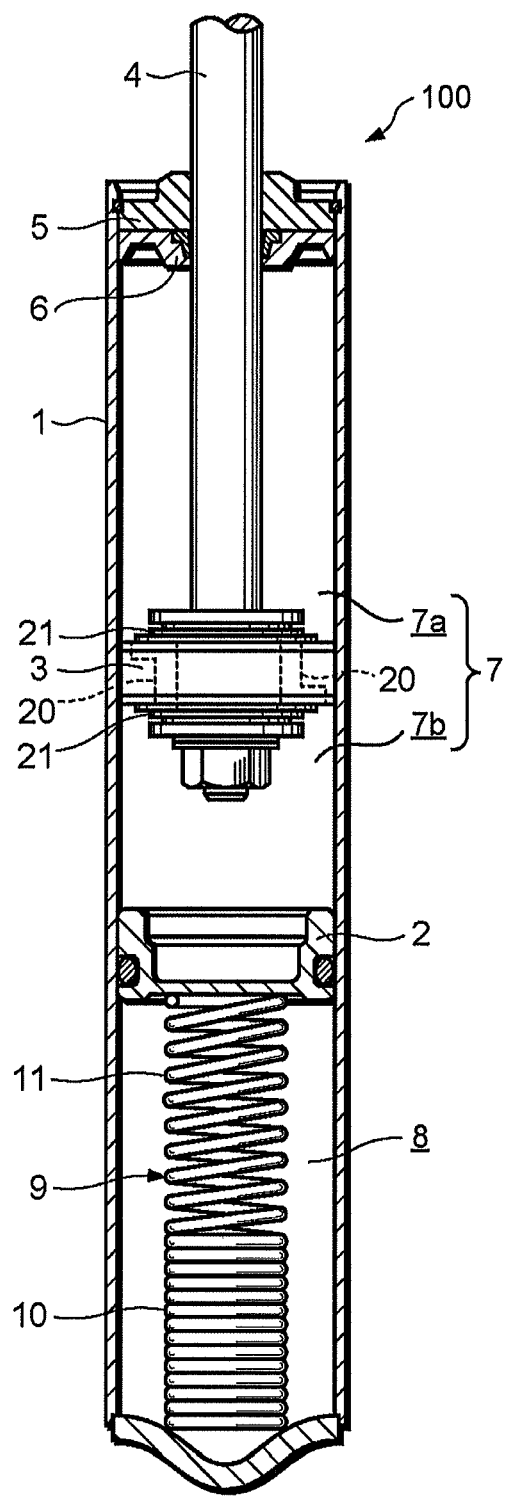
FIG. 2 is a view showing a small spring constant site of an elastic member in a maximally compressed state in the single cylinder type hydraulic shock absorber for a vehicle according to an embodiment of this invention.
Figure 3:
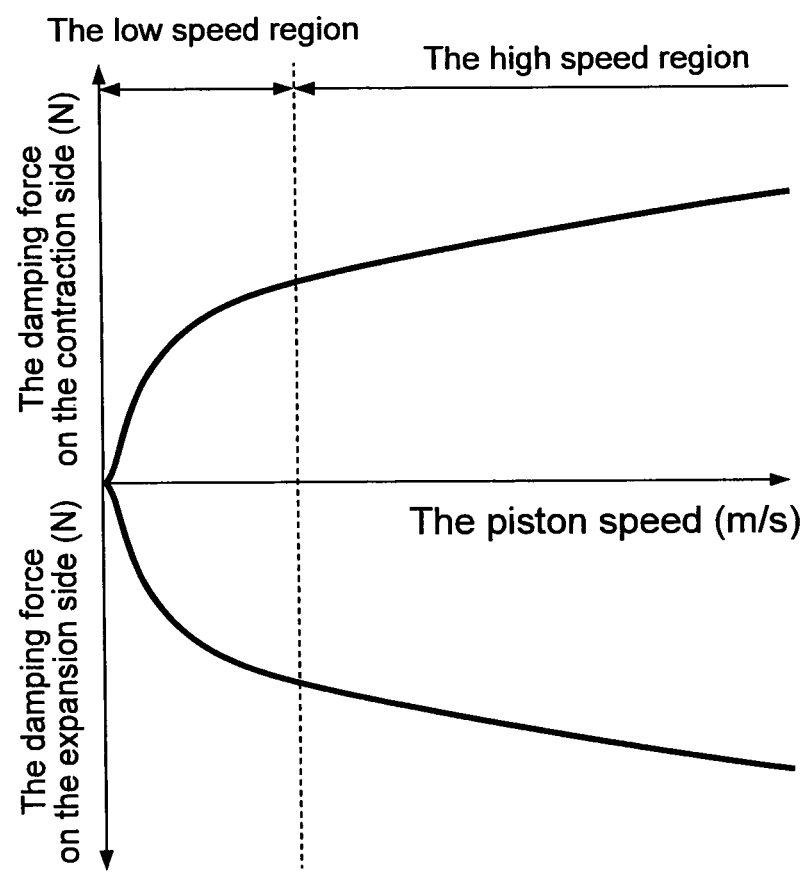
FIG. 3 is a graph showing a damping characteristic of the single cylinder type hydraulic shock absorber for a vehicle according to an embodiment of this invention.

The coil spring 9 is constituted such that when it is compressed from a vertical direction, the small spring constant site 10 enters a maximally compressed state before the large spring constant site 11 deforms maximally into a maximally compressed state in which adjacent coils come into contact with each other (see FIG. 2). Thus, the spring constant of the coil spring 9 is constituted to be variable.

When the shock absorber 100 expands and contracts such that the piston 3 displaces relative to the cylinder 1, the free piston 2 also displaces by an amount obtained by dividing an infiltration volume or a withdrawal volume of the rod 4 by a pressure-receiving area of the piston 3.

When the small spring constant site 10 has not entered the maximally compressed state relative to the displacement of the free piston 2, the coil spring 9 causes a spring reaction force to act on the free piston 2 at a combined spring constant that is identical to a spring constant obtained by disposing a spring having a small spring constant and a spring having a large spring constant in series.

On the other hand, when the small spring constant site 10 enters the maximally compressed state relative to the displacement of the free piston 2, the coil spring 9 causes a spring reaction force to act on the free piston 2 at a large spring constant. Thus, the spring constant of the coil spring 9 is set to increase during contraction.

In this embodiment, the small spring constant site 10 is set to enter the maximally compressed state, in which adjacent coils come into contact with each other, when a stroke position of the piston 3 relative to the cylinder 1 reaches a predetermined position. Specifically, the predetermined position is a neutral position that is the center of the stroke of the piston 3.

Next, actions of the shock absorber 100 constituted in the above manner will be described.

When the stroke position of the piston 3 relative to the cylinder 1 is in the aforementioned neutral position such that the small spring constant site 10 of the coil spring 9 is in the maximally compressed state, as shown in FIG. 2, the fluid chamber 7 is pressurized by the gas pressure in the gas chamber 8 and the spring reaction force of the coil spring 9.

A case in which the shock absorber 100 contracts from this state will now be considered. During the contraction stroke, an excess of fluid corresponding to the volume by which the rod 4 infiltrates the cylinder 1 is generated, and therefore the free piston 2 displaces while compressing the coil spring 9 in a direction for reducing the volume of the gas chamber 8.

At this time, the small spring constant site 10 of the coil spring 9 is in the maximally compressed state, and therefore the coil spring 9 causes a spring reaction force that is commensurate with the deformation amount of the large spring constant site 11 to act relative to the displacement of the free piston 2.

When the contraction amount of the shock absorber 100 is small, the piston speed is typically low and therefore remains in a low speed region. In this case, the rod infiltration volume is small and the deformation amount of the large spring constant site 11 is also sufficiently small. Therefore, the fluid chamber 7 is not greatly pressurized by the free piston 2. Hence, as shown in FIG. 3, the damping characteristic of the shock absorber 100 in the low speed region is such that the damping force is not excessively large, and therefore passenger comfort can be maintained in the vehicle.

When the contraction amount of the shock absorber 100 is large, the piston speed typically increases into a high speed region. In this case, the rod infiltration volume is large and the deformation amount of the large spring constant site 11 is also large. Therefore, the free piston 2 is biased not only by the internal pressure of the gas chamber 8, but also by a large spring reaction force commensurate with the deformation amount of the coil spring 9. Hence, in the high speed region, the fluid chamber 7 receives greater pressure from the free piston 2 than in a conventional shock absorber.

As a result, a situation in which the free piston 2 moves in parallel with the piston 3 is avoided even when the piston speed increases during the contraction stroke. Therefore, as shown in FIG. 3, the damping characteristic in the high speed region is such that the damping force is prevented from peaking, and as a result, vibration in the vehicle body can be suppressed sufficiently, enabling an improvement in passenger comfort.

Furthermore, by avoiding a situation in which the free piston 2 moves in parallel with the piston 3, the internal pressure of the expansion side pressure chamber 7a is prevented from falling below the outside air pressure. As a result, outside air is prevented from being sucked into the cylinder 1 through a gap between the rod 4 and the sealing member 6, thereby eliminating the danger of aeration, adiabatic compression, and so on.

Further, the spring constant of the coil spring 9 increases during contraction, and the resulting reaction force acts to supplement the biasing force applied to the free piston 2 by the gas pressure in the gas chamber 8. Hence, a phenomenon whereby the internal pressure of the fluid chamber 7 increases excessively, which occurs when the internal pressure of the gas chamber 8 is set high, can be avoided, and therefore the passenger comfort of the vehicle is not impaired. Furthermore, the internal pressure of the fluid chamber 7 does not act excessively on the sealing member 6, and therefore the rod 4 is not prevented from moving smoothly, and the life of the sealing member 6 is not shortened.

When the shock absorber 100 expands, the free piston 2 displaces in a direction for increasing the volume of the gas chamber 8. At this time, the spring reaction force of the coil spring 9 corresponds to the combined spring constant of the small spring constant and the large spring constant, and is therefore sufficiently weak. Accordingly, the internal pressure of the fluid chamber 7a that is compressed during the expansion stroke can be made equal to that of a conventional shock absorber, and the resulting damping characteristic is as shown in FIG. 3, whereby vibration in the vehicle body can be suppressed and the passenger comfort can be improved.

Furthermore, by setting the stroke position of the piston 3 at which the spring constant of the coil spring 9 increases in the neutral position, as described above, a situation in which the internal pressure of the fluid chamber 7 increases in relation to a small amount of vibration, which causes the piston speed in the vicinity of the neutral position to decrease, can be effectively prevented. As a result, the damping characteristic of the shock absorber 100 is prevented from becoming excessively large, and the passenger comfort of the vehicle is not impaired. Furthermore, a situation in which the internal pressure of the fluid chamber 7 acts excessively on the sealing member 6 can be prevented even more effectively.

In the above description, the small spring constant site 10 is set to enter the maximally compressed state when the stroke position of the piston 3 is the in neutral position. However, the stroke position of the piston 3 in which the small spring constant site 10 enters the maximally compressed state may be modified appropriately in accordance with the use application of the vehicle and so on.

For example, the small spring constant site 10 may be set to be capable of expansion and contraction when the stroke position of the piston 3 is the in neutral position. In this case, the small spring constant site 10 expands and contracts during a normal operation of the vehicle, thereby causing a spring reaction force to act on the free piston 2. On the other hand, when the vehicle travels over a large step or the like, generating a large amount of vibration, the small spring constant site 10 enters the maximally compressed state such that a spring reaction force is caused to act on the free piston 2 by the expansion and contraction of the large spring constant site 11. By setting the small spring constant site 10 in this manner, a situation in which the free piston 2 moves in parallel with the piston 3 is avoided when the piston speed increases during the contraction stroke of the shock absorber 100, and the damping force is prevented from peaking in the high speed region.

Further, the elastic member of this embodiment is formed by disposing the single small spring constant site 10 and the single large spring constant site 11 in series. However, the elastic member may be formed by disposing a plurality of small spring constant sites and a plurality of large spring constant sites in series, for example. The elastic member may also be constituted by a small spring constant site and a large spring constant site disposed parallel thereto and on the outer periphery or inner periphery thereof such that the small spring constant site is constantly sandwiched between the free piston 2 and the end portion of the cylinder 1. Thus, when the free piston 2 displaces in a direction for shrinking the gas chamber 8, the large spring constant site comes into contact with the free piston 2.

Second Embodiment

Next, referring to FIG. 4, a single cylinder type hydraulic shock absorber for a vehicle 200 according to a second embodiment of this invention will be described. It should be noted that identical members to those of the shock absorber 100 according to the first embodiment described above have been allocated identical reference symbols, and description thereof has been omitted.

The shock absorber 200 differs from the shock absorber 100 of the first embodiment in the constitution of the elastic member. The following description will focus on this difference.

Figure 4:
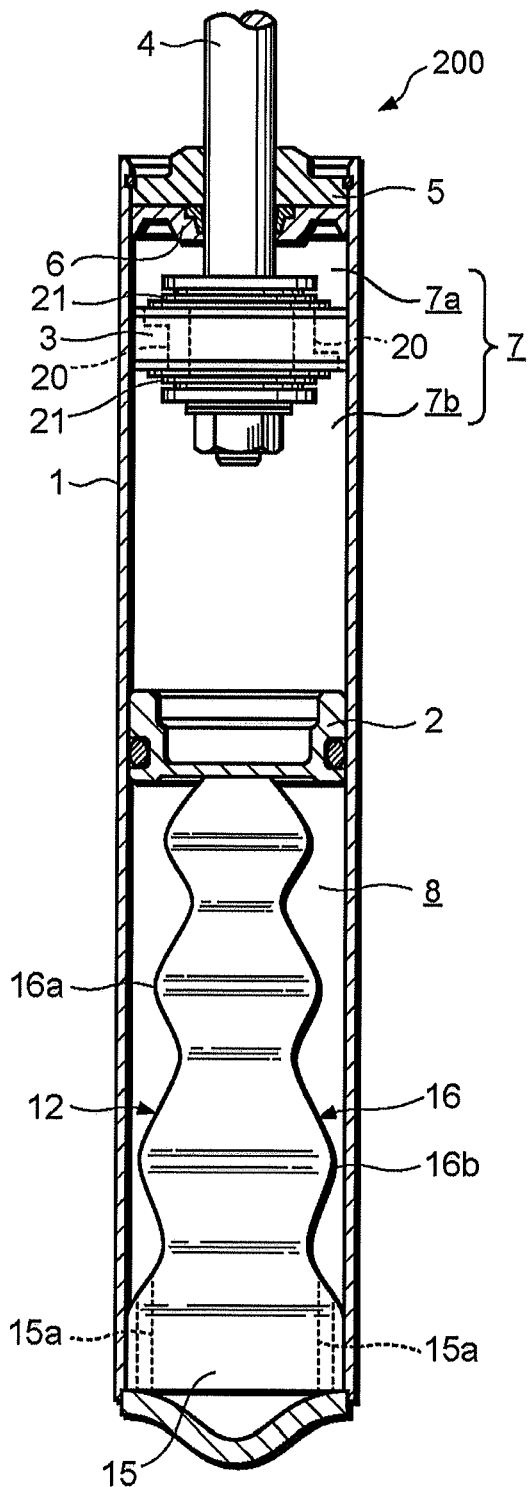
FIG. 4 is a longitudinal sectional view of a single cylinder type hydraulic shock absorber for a vehicle according to another embodiment of this invention.
Figure 5:
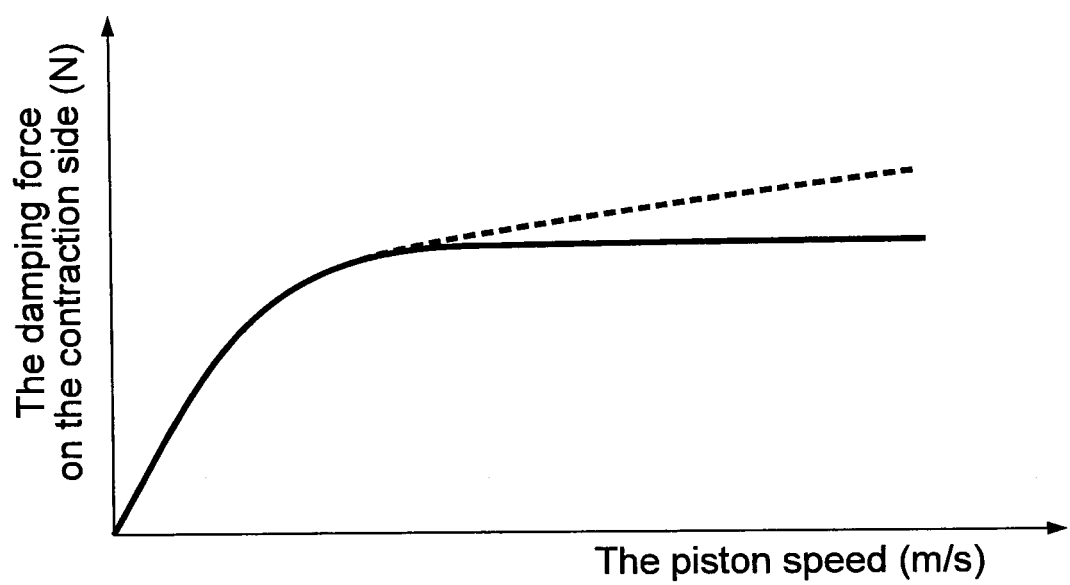
FIG. 5 is a graph showing a damping characteristic of a conventional single cylinder type hydraulic shock absorber for a vehicle.

An elastic member 12 of the shock absorber 200 is made of synthetic resin, and as shown in FIG. 4, comprises a base portion 15 that is fitted to the inner periphery of the cylinder 1, and a biasing portion 16 that stands upright from the base portion 15 and contacts the end portion of the free piston 2.

The biasing portion 16 comprises a small spring constant site 16a on its tip end side and a large spring constant site 16b on its base end side. Likewise in this embodiment, the small spring constant site 16a is set to enter a maximally compressed state when the stroke position of the piston 3 relative to the cylinder 1 is in the neutral position.

The outer diameter of the base portion 15 is set to be equal to or slightly larger than the inner diameter of the cylinder 1, and by fitting the base portion 15 into the end portion of the cylinder 1, the elastic member 12 is positioned within the cylinder 1. Further, the length of the elastic member 12 is set such that the biasing portion 16 contacts the end face of the free piston 2 even when the shock absorber 200 is in a maximally expanded state and the volume of the gas chamber 8 is at a maximum. Hence, a situation in which the free piston 2 and the elastic member 12 collide vigorously and the elastic member 12 moves violently within the cylinder 1 when the shock absorber 200 expands and contracts, is avoided. Therefore, abnormal noise generation is prevented.

The base portion 15 is provided with a through hole 15a penetrating vertically. When the base portion 15 is fitted to the end portion of the cylinder 1 such that the elastic member 12 is accommodated within the gas chamber 8, an operation to seal a gas in the gas chamber 8 can be performed through the through hole 15a.

The elastic member 12 is constituted such that when it is compressed from a vertical direction, the small spring constant site 16a enters the maximally compressed state before the large spring constant site 16b deforms maximally into a maximally compressed state. Thus, the spring constant of the elastic member 12 is constituted to be variable.

When the shock absorber 200 expands and contracts such that the piston 3 displaces relative to the cylinder 1, the free piston 2 also displaces by an amount obtained by dividing the infiltration volume or withdrawal volume of the rod 4 by the pressure-receiving area of the piston 3.

When the small spring constant site 16a has not entered the maximally compressed state relative to the displacement of the free piston 2, the elastic member 12 causes a spring reaction force to act on the free piston 2 at a combined spring constant that is identical to a spring constant obtained when a spring having a small spring constant and a spring having a large spring constant are disposed in series.

On the other hand, when the small spring constant site 16a enters the maximally compressed state relative to the displacement of the free piston 2, the elastic member 12 causes a spring reaction force to act on the free piston 2 at a large spring constant. Thus, the spring constant of the elastic member 12 is set to increase during contraction.

As will be described below, the shock absorber 200 constituted in the above manner exhibits similar actions and effects to the shock absorber 100 of the first embodiment.

The free piston 2 is biased not only by the internal pressure of the gas chamber 8, but also by a large spring reaction force commensurate with the deformation amount of the elastic member 12. Hence, a situation in which the free piston 2 moves in parallel with the piston 3 is avoided even when the piston speed increases during the contraction stroke. Accordingly, the damping characteristic in the high speed region is such that the damping force is prevented from peaking, as shown in FIG. 3.

By avoiding a situation in which the free piston 2 moves in parallel with the piston 3, the internal pressure of the expansion side pressure chamber 7a is prevented from falling below the outside air pressure. As a result, outside air is prevented from being sucked into the cylinder 1 through the gap between the rod 4 and the sealing member 6, thereby eliminating the danger of aeration, adiabatic compression, and so on.

Further, the spring constant of the elastic member 12 increases during contraction, and the resulting reaction force acts to supplement the biasing force applied to the free piston 2 by the gas pressure in the gas chamber 8. Hence, a phenomenon whereby the internal pressure of the fluid chamber 7 increases excessively, which occurs when the internal pressure of the gas chamber 8 is set high, can be avoided, and therefore the passenger comfort of the vehicle is not impaired. Furthermore, the internal pressure of the fluid chamber 7 does not act excessively on the sealing member 6, and therefore the rod 4 is not prevented from moving smoothly, and the life of the sealing member 6 is not shortened.

When the shock absorber 200 expands, the free piston 2 displaces in a direction for increasing the volume of the gas chamber 8. At this time, the spring reaction force of the elastic member 12 corresponds to the combined spring constant of the small spring constant and the large spring constant, and is therefore sufficiently weak. Accordingly, the internal pressure of the fluid chamber 7a that is compressed during the expansion stroke can be made equal to that of a conventional shock absorber, and the damping characteristic is as shown in FIG. 3, whereby vibration in the vehicle body can be suppressed and the passenger comfort can be improved.

Furthermore, by setting the stroke position of the piston 3 at which the spring constant of the elastic member 12 increases in the neutral position, a situation in which the internal pressure of the fluid chamber 7 increases in relation to a small amount of vibration, which causes the piston speed in the vicinity of the neutral position to decrease, can be effectively prevented. As a result, the damping characteristic of the shock absorber 200 is prevented from becoming excessively large, and the passenger comfort of the vehicle is not impaired. Furthermore, a situation in which the internal pressure of the fluid chamber 7 acts excessively on the sealing member 6 can be prevented even more effectively.

Moreover, since the elastic member 12 is made of synthetic resin, it is lighter than an elastic member such as a coil spring, and therefore a reduction in the weight of the shock absorber 200 can be achieved. Furthermore, the base portion 15 can be fitted into the lower end of the cylinder 1, and therefore positioning of the elastic member 12 relative to the cylinder 1 during an assembly operation of the shock absorber 200 is extremely easy.

This invention is not limited to the embodiments described above, and may of course be subjected to various modifications within the technical scope of the spirit of the invention.

INDUSTRIAL APPLICABILITY

This invention may be applied to a shock absorber that is interposed between a vehicle body and an axle of a vehicle.

The invention claimed is:

1. A single cylinder type hydraulic shock absorber for a vehicle, which is interposed between a vehicle body and an axle of the vehicle to suppress vibration in the vehicle body, the shock absorber comprising:
   a cylinder;
   a free piston slidably disposed within the cylinder and delimiting a fluid chamber and a gas chamber in the cylinder, wherein a pressurized gas is sealed in the gas chamber;
   a fluid piston that is slidably disposed in the cylinder and delimits the fluid chamber into an expansion side pressure chamber and a contraction side pressure chamber;
   a rod connected to the fluid piston;
   a passage that is provided in the fluid piston and connects the expansion side pressure chamber and the contraction side pressure chamber;
   a damping force generating element that is interposed in the passage and applies resistance to a flow of fluid through the passage; and an elastic member disposed within the gas chamber and biasing the free piston towards the fluid chamber, wherein via the free piston, the contraction side pressure chamber is pressurized directly by a gas pressure in the gas chamber and a reaction force of the elastic member, the elastic member is set such that a spring constant thereof increases during contraction so as to bias the free piston so that the free piston at no time moves in parallel with the fluid piston during an entire contraction stroke of the hydraulic shock absorber, the elastic member having a small spring constant site and a large spring constant site that has a spring constant greater than that of the small spring constant site.

2. The single cylinder type hydraulic shock absorber for a vehicle as defined in claim 1, wherein the small spring constant site enters a maximally compressed state when a stroke position of the fluid piston relative to the cylinder is in a predetermined position.

3. The single cylinder type hydraulic shock absorber for a vehicle as defined in claim 2, wherein the predetermined position is a neutral position that is a resting position of the fluid piston.

4. The single cylinder type hydraulic shock absorber for a vehicle as defined in claim 1, wherein the small spring constant site is set to be capable of expanding and contracting when a stroke position of the fluid piston is in a neutral position that is a resting position of the fluid piston.

5. The single cylinder type hydraulic shock absorber for a vehicle as defined in claim 1, wherein the elastic member is sandwiched by the free piston and an end portion of the cylinder.

6. The single cylinder type hydraulic shock absorber for a vehicle as defined in claim 1, wherein the elastic member is made of a synthetic resin, and comprises a base portion that is fitted to an inner periphery of the cylinder, and a biasing portion that stands upright from the base portion and contacts an end portion of the free piston.

7. The single cylinder type hydraulic shock absorber for a vehicle as defined in claim 1, wherein the free piston is biased by the elastic member so that in every contraction stroke of the hydraulic shock absorber, the free piston at no time moves in parallel with the fluid piston.

\* \* \* \* \*

UNITED STATES PATENT AND TRADEMARK OFFICE
CERTIFICATE OF CORRECTION

PATENT NO. : 8,448,759 B2  
APPLICATION NO. : 12/084653  
DATED : May 28, 2013  
INVENTOR(S) : Akihisa Ota It is certified that error appears in the above-identified patent and that said Letters Patent is hereby corrected as shown below:

Title Page 2, FOREIGN PATENT DOCUMENTS, Column 2, line 3, should read:

JP    63-34336    02-1988

Signed and Sealed this  
First Day of October, 2013

Teresa Stanek Rea  
*Deputy Director of the United States Patent and Trademark Office*